(12) United States Patent
Assaf et al.

(10) Patent No.: US 9,457,789 B2
(45) Date of Patent: Oct. 4, 2016

(54) SYSTEM AND METHOD FOR CONTROLLING A MULTI-FUEL ENGINE TO REDUCE ENGINE PUMPING LOSSES

(71) Applicant: GM Global Technology Operations LLC, Detroit, MI (US)

(72) Inventors: Tameem K. Assaf, Milford, MI (US); Louis A. Avallone, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 14/276,031

(22) Filed: May 13, 2014

(65) Prior Publication Data

US 2015/0330325 A1    Nov. 19, 2015

(51) Int. Cl.
B60W 10/10    (2012.01)
F02D 41/30    (2006.01)
(Continued)

(52) U.S. Cl.
CPC .......... B60W 10/10 (2013.01); F02D 13/0219 (2013.01); F02D 13/08 (2013.01); F02D 19/061 (2013.01); F02D 19/0647 (2013.01); F02D 41/0025 (2013.01); F02D 41/0225 (2013.01); F02D 41/26 (2013.01); F02D 41/30 (2013.01);
(Continued)

(58) Field of Classification Search
CPC ....................... F02D 19/0615; F02D 19/0647; F02D 19/0692; F02D 19/0623; F02D 41/0025; F02D 19/061; F02D 19/0694; F02D 19/081; F02D 41/0027; F02D 2200/0404; F02D 2250/21; F02D 41/0085; Y02T 10/36

USPC .......... 701/103, 104, 111, 114; 123/481, 525, 123/575–578, 673, 674, 679, 691, 692, 123/198 F
See application file for complete search history.

(56) References Cited

U.S. PATENT DOCUMENTS 3,972,230 A    8/1976    Hanson et al.
4,445,326 A    5/1984    Lyon
(Continued)

FOREIGN PATENT DOCUMENTS

GB    2277594 A    11/1994
JP    2011-064075    3/2011

OTHER PUBLICATIONS

Mizushima, Norifumi; Ito, Shingo; Kusaka, Jin; and Daisho, Yasuhiro; "Improvement of Combustion in a Dual Fuel Natural Gas Engine with Half the Number of Cyclinder," JSAE 20030146; SAE 2003-1-1938; Waseda University; International Springs Fuels & Lubricants Meeting, Yokohama, Japan; May 19-22, 2003; 10 Pages.

Primary Examiner — Erick Solis
Assistant Examiner — Carl Staubach (57) ABSTRACT

A fuel control module, based on an engine torque request, fuels N cylinders of an engine using a first fuel system. N is an integer greater than zero. A throttle control module, based on the engine torque request and the fueling of the N cylinders using the first fuel system, opens a throttle valve to a predetermined wide open throttle (WOT) position. A cost module, when the engine torque request is greater than a predetermined torque: determines a first cost value for fueling at least one of the N cylinders of the engine using a second fuel system; and determines a second cost value for adjusting at least one operating parameter other than fueling of the engine. An adjustment module, based on, the first and second cost values, one of: initiates the fueling of the at least one of the N cylinders using the second fuel system; and adjusts of the at least one operating parameter other than fueling of the engine.

14 Claims, 4 Drawing Sheets

(51) Int. Cl.
*F02D 13/02* (2006.01)
*F02D 13/08* (2006.01)
*F02D 19/06* (2006.01)
*F02D 41/02* (2006.01)
*F02D 41/26* (2006.01)
*F02D 41/00* (2006.01)

(52) U.S. Cl.
CPC ........ *F02D 2200/0404* (2013.01); *Y02T 10/18* (2013.01); *Y02T 10/36* (2013.01)

(56) References Cited

U.S. PATENT DOCUMENTS

| | | | |
|---|---|---|---|
| 5,044,195 A | 9/1991 | James et al. | |
| 5,268,086 A | 12/1993 | Hamburg et al. | |
| 5,361,629 A | 11/1994 | McCombie | |
| 5,431,044 A | 7/1995 | Kiess et al. | |
| 5,437,154 A | 8/1995 | Sato et al. | |
| 5,506,778 A | 4/1996 | Matsumoto et al. | |
| 5,661,974 A | 9/1997 | Kitamura et al. | |
| 5,700,954 A | 12/1997 | Sinha et al. | |
| 5,735,246 A | 4/1998 | Vincent et al. | |
| 5,755,211 A * | 5/1998 | Koch | F02D 19/0647 123/525 |
| 5,822,710 A | 10/1998 | Mezger et al. | |
| 5,826,563 A | 10/1998 | Patel et al. | |
| 5,832,721 A | 11/1998 | Cullen | |
| 5,841,025 A | 11/1998 | Remboski et al. | |
| 5,956,941 A | 9/1999 | Cullen et al. | |
| 6,092,015 A | 7/2000 | Takahashi et al. | |
| 6,244,042 B1 | 6/2001 | Dickers et al. | |
| 6,269,632 B1 | 8/2001 | Schmitz | |
| 6,314,802 B1 | 11/2001 | Wu et al. | |
| 6,360,724 B1 | 3/2002 | Suhre et al. | |
| 6,371,092 B1 | 4/2002 | Guglielmo et al. | |
| 6,388,444 B1 | 5/2002 | Hahn et al. | |
| 6,405,705 B1 | 6/2002 | Dunsworth et al. | |
| 6,520,159 B2 | 2/2003 | White et al. | |
| 6,691,507 B1 | 2/2004 | Meyer et al. | |
| 6,847,882 B2 | 1/2005 | Miller et al. | |
| 6,885,932 B2 | 4/2005 | Liu et al. | |
| 7,007,460 B2 | 3/2006 | Frieden et al. | |
| 7,069,718 B2 * | 7/2006 | Surnilla | F01N 13/011 123/198 F |
| 7,158,875 B2 | 1/2007 | Yasui et al. | |
| 7,192,385 B2 * | 3/2007 | Yu | B60W 10/023 477/109 |
| 7,325,446 B1 | 2/2008 | Assaf et al. | |
| 7,359,793 B2 | 4/2008 | Galtier et al. | |
| 7,500,470 B2 | 3/2009 | Buslepp et al. | |
| 7,591,172 B2 | 9/2009 | Lynch et al. | |
| 7,627,416 B2 * | 12/2009 | Batenburg | F02D 19/027 123/525 |
| 7,654,248 B2 | 2/2010 | Buslepp et al. | |
| 7,680,583 B2 | 3/2010 | McKay et al. | |
| 7,752,900 B2 | 7/2010 | Galtier et al. | |
| 7,765,857 B2 | 8/2010 | Suzuki | |
| 7,913,673 B2 * | 3/2011 | Vanderslice | F02D 19/0631 123/27 GE |
| 7,941,265 B2 | 5/2011 | Miller et al. | |
| 8,027,782 B2 | 9/2011 | Assaf et al. | |
| 8,091,538 B2 | 1/2012 | Hartmann et al. | |
| 8,166,956 B2 * | 5/2012 | Ulrey | F02D 19/0694 123/525 |
| 8,275,538 B2 * | 9/2012 | Surnilla | F02B 17/005 123/179.16 |
| 8,307,808 B2 | 11/2012 | Kaiser et al. | |
| 8,342,158 B2 * | 1/2013 | Ulrey | F02D 19/0694 123/431 |
| 8,392,096 B2 | 3/2013 | Mathews et al. | |
| 8,555,863 B2 * | 10/2013 | Nakayama | F02D 19/0615 123/525 |
| 8,601,862 B1 | 12/2013 | Bowman et al. | |
| 8,646,252 B2 | 2/2014 | Gibson et al. | |
| 8,812,219 B2 * | 8/2014 | Shinoda | F02D 19/0615 123/575 |
| 9,046,049 B2 * | 6/2015 | Jeon | F02D 19/0647 |
| 9,233,679 B2 * | 1/2016 | Leone | B60W 10/02 |
| 2004/0206071 A1 | 10/2004 | Glugla et al. | |
| 2006/0101823 A1 * | 5/2006 | Takemoto | B60K 6/24 60/716 |
| 2009/0133464 A1 | 5/2009 | Sell et al. | |
| 2009/0184105 A1 | 7/2009 | Hasegawa | |
| 2010/0162803 A1 | 7/2010 | Scafati et al. | |
| 2011/0017174 A1 * | 1/2011 | Ulrey | F02D 19/0628 123/456 |
| 2011/0023590 A1 | 2/2011 | Van Nieuwstadt et al. | |
| 2011/0066358 A1 | 3/2011 | Assaf et al. | |
| 2011/0167797 A1 | 7/2011 | Gibson et al. | |
| 2011/0253100 A1 | 10/2011 | Kaiser et al. | |
| 2011/0253101 A1 | 10/2011 | Mathews et al. | |
| 2012/0143480 A1 * | 6/2012 | Pursifull | F02D 19/0615 701/105 |
| 2012/0210981 A1 * | 8/2012 | Ulrey | F02D 19/0694 123/456 |
| 2013/0788564 | 3/2013 | Assaf et al. | |
| 2014/0020655 A1 | 1/2014 | Ito et al. | |
| 2014/0277975 A1 * | 9/2014 | Badillo | B60W 10/06 701/54 |
| 2015/0307075 A1 * | 10/2015 | Leone | B60W 10/02 701/55 |

* cited by examiner

SYSTEM AND METHOD FOR CONTROLLING A MULTI-FUEL ENGINE TO REDUCE ENGINE PUMPING LOSSES

FIELD

The present disclosure relates to internal combustion engines and more particularly to multi-fuel control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A fuel control module, based on an engine torque request, fuels N cylinders of an engine using a first fuel system, wherein N is an integer greater than zero. A throttle control module, based on the engine torque request and the fueling of the N cylinders using the first fuel system, opens a throttle valve to a predetermined wide open throttle (WOT) position. A cost module, when the engine torque request is greater than a predetermined torque: determines a first cost value for fueling at least one of the N cylinders of the engine using a second fuel system; and determines a second cost value for adjusting at least one operating parameter other than fueling of the engine. An adjustment module, based on the first and second cost values, one of: initiates the fueling of the at least one of the N cylinders using the second fuel system; and adjusts of the at least one operating parameter other than fueling of the engine.

In further features, the adjustment module adjusts the fueling of the at least one of the N cylinders using the second fuel system when the first cost value is less than the second cost value.

In still further features, the adjustment module commands the adjustment of the at least one operating parameter other than fueling of the engine when the second cost value is less than the first cost value.

In yet further features: the cost module determines the second cost value for downshifting a transmission from a current transmission gear ratio; and the adjustment module selectively commands the downshift of the transmission based on a comparison of the first and second cost values.

In further features, the cost module: determines a first set of possible operating parameters based on current operating parameters and based on fueling at least one of the N cylinders of the engine using the second fuel system; determines the first cost value based on the first set of possible operating parameters; determines a second set of possible operating parameters based on the current operating parameters and based on adjusting the at least one operating parameter other than fueling of the engine; and determines the second cost value based on the second set of possible operating parameters.

In still further features, a torque limit module determines the predetermined torque based on the current operating parameters.

In yet further features: the first fuel system injects a first type of fuel; and the second fuel system injects a second type of fuel that is different than the first type of fuel.

In further features: the first type of fuel is compressed natural gas (CNG); and the second type of fuel is gasoline.

In yet further features: the first fuel system injects a first fuel at first locations associated with the cylinders, respectively; the second fuel system injects a second fuel at second locations associated with the cylinders, respectively; and the first locations are different than the second locations.

In still further features: the first fuel system injects a first fuel into intake ports associated with the cylinders, respectively; and the second fuel system injects a second fuel directly into the cylinders, respectively.

A control method for a vehicle includes: based on an engine torque request, fueling N cylinders of an engine using a first fuel system, wherein N is an integer greater than zero; based on the engine torque request and the fueling of the N cylinders using the first fuel system, opening a throttle valve to a predetermined wide open throttle (WOT) position; when the engine torque request is greater than a predetermined torque: determining a first cost value for fueling at least one of the N cylinders of the engine using a second fuel system; and determining a second cost value for adjusting at least one operating parameter other than fueling of the engine. The control method further includes, based on the first and second cost values, one of: initiating the fueling of the at least one of the N cylinders using the second fuel system; and adjusting of the at least one operating parameter other than fueling of the engine.

In further features, the control method further includes adjusting the fueling of the at least one of the N cylinders using the second fuel system when the first cost value is less than the second cost value.

In yet further features, the control method further includes commanding the adjustment of the at least one operating parameter other than fueling of the engine when the second cost value is less than the first cost value.

In still further features, the control method further includes: determining the second cost value for downshifting a transmission from a current transmission gear ratio; and selectively commanding the downshift of the transmission based on a comparison of the first and second cost values.

In further features, the control method further includes: determining a first set of possible operating parameters based on current operating parameters and based on fueling at least one of the N cylinders of the engine using the second fuel system; determining the first cost value based on the first set of possible operating parameters; determining a second set of possible operating parameters based on the current operating parameters and based on adjusting the at least one operating parameter other than fueling of the engine; and determining the second cost value based on the second set of possible operating parameters.

In further features, the control method further includes determining the predetermined torque based on the current operating parameters.

In further features: the first fuel system injects a first type of fuel; and the second fuel system injects a second type of fuel that is different than the first type of fuel.

In still further features: the first type of fuel is compressed natural gas (CNG); and the second type of fuel is gasoline.

In yet further features: the first fuel system injects a first fuel at first locations associated with the cylinders, respectively; the second fuel system injects a second fuel at second locations associated with the cylinders, respectively; and the first locations are different than the second locations.

In yet further features: the first fuel system injects a first fuel into intake ports associated with the cylinders, respectively; and the second fuel system injects a second fuel directly into the cylinders, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to generate torque. Some engines can be fueled using two fuel systems and can therefore be called bi-fuel engines. Different fuel systems can be used to inject different types of fuel. Additionally or alternatively, different fuel systems can be used to inject fuel at different locations. For example, one fuel system may inject gasoline and another fuel system may inject compressed natural gas (CNG). As another example, one fuel system may inject fuel directly into cylinders of the engine and another fuel system may inject the fuel into intake ports associated with the cylinders.

Different types of fuel and different fuel injection locations require different airflow conditions. For example, more airflow into an engine is needed to achieve a stoichiometric mixture of air and CNG than the airflow needed to achieve a stoichiometric mixture of air and gasoline. An engine control module (ECM) may open a throttle valve to increase airflow into the engine.

According to the present disclosure, the ECM opens the throttle valve for fueling that requires more airflow than another type of fueling. Opening the throttle valve decreases pumping losses of the engine. For example, the ECM may open the throttle valve to a predetermined wide open throttle (WOT) position to minimize pumping losses of the engine. The engine can also produce more torque by changing the fueling of one or more cylinders without having to adjust the throttle valve.

When a requested amount of engine torque is greater than a predetermined torque, the ECM determines a first cost of changing fueling and a second cost of changing one or more other operating parameters, such as downshifting a transmission to a different gear ratio. When the first cost is less than the second cost, the ECM may change fueling of one or more cylinders of the engine. For example, the ECM may switch from supplying CNG to a cylinder to supplying gasoline to a cylinder, or switch from using port fuel injection to using direct fuel injection for a cylinder. When the second cost is less than the first cost, the ECM may command a downshift of the transmission.

Figure 1:
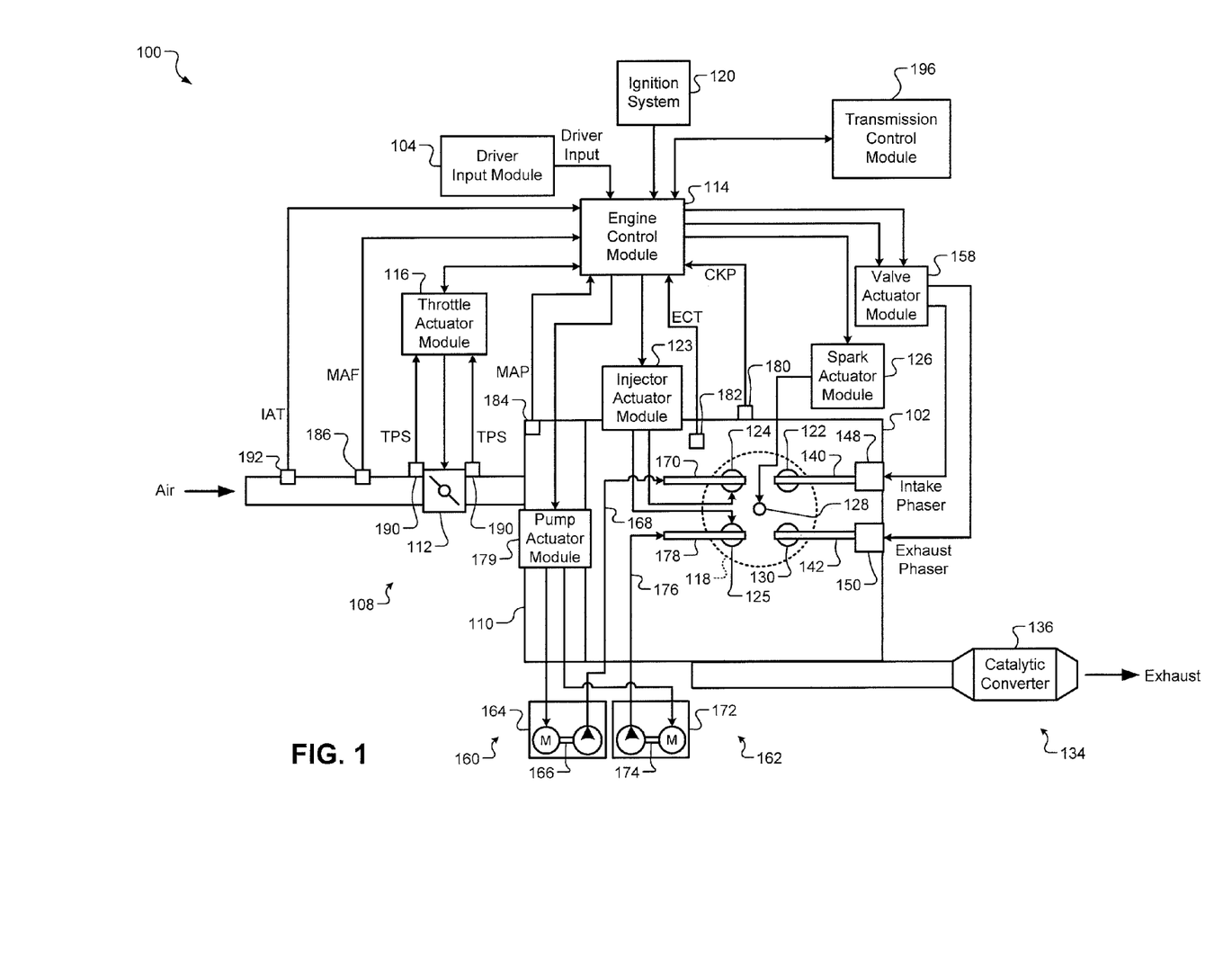
FIG. 1 is a functional block diagram of an example engine system.

Referring to FIG. 1, an engine system 100 includes an engine 102 that combusts an air/fuel mixture to produce drive torque for a vehicle. The engine 102 produces drive torque based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

The ECM 114 may start and stop the engine 102 based on an input received from an ignition system 120. The ignition system 120 may include a key or a button. The ECM 114 may start the engine 102 when a driver turns the key from an off position to an on (or run) position or when the driver presses the button. The ECM 114 may stop the engine 102 when a driver turns the key from the on position to the off position or when the driver presses the button while the engine 102 is running. The ECM 114 may deactivate one or more cylinders while the engine 102 is running, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls an injector actuator module 123, which controls opening of a fuel injector 124 and a fuel injector 125. The fuel injectors 124 and 125 may inject fuel into intake ports associated with the cylinders, into mixing chambers associated with the cylinders, directly into the cylinders, or a combination of the above. The injector actuator module 123 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134. The exhaust system 134 includes a catalytic converter 136 that reduces emissions.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake cam phaser 148 and the exhaust cam phaser 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 and the exhaust valve 130 by decoupling the intake valve 122 and the exhaust valve 130 from the intake camshaft 140 and the exhaust camshaft 142, respectively. In various implementations, the intake valve 122 and/or the exhaust valve 130 may be controlled by devices other than camshafts, such as electrohydraulic and/or electromagnetic actuators.

The engine system 100 may include a first fuel system 160 and a second fuel system 162. The first fuel system 160 includes a fuel tank 164, a fuel pump 166, a fuel line 168, a fuel rail 170, the fuel injector 124, and other fuel injectors for injecting fuel from the fuel tank 164. The fuel tank 164 may store fuel such as gasoline. The fuel pump 166 delivers fuel from the fuel tank 164 to the fuel rail 170 through the fuel line 168. The fuel rail 170 distributes fuel to the fuel injector 124 and the other fuel injectors that inject fuel from the fuel tank 164.

The second fuel system 162 includes a fuel tank 172, a fuel pump 174, a fuel line 176, a fuel rail 178, and the fuel injector 125. The fuel tank 172 may store a second fuel, such as compressed natural gas (CNG). The fuel pump 174 delivers fuel from the fuel tank 172 to the fuel rail 178 through the fuel line 176. The fuel rail 178 distributes fuel to the fuel injector 125 and other fuel injectors of fuel from the fuel tank 172. The ECM 114 controls a pump actuator module 179, which regulates the output of the fuel pump 166 and the fuel pump 174 to achieve a desired pressure in the fuel line 168 and the fuel line 176, respectively.

While the example where the first fuel system 160 injects gasoline and the second fuel system 162 injects CNG, the present application is applicable to other types of fuels. For example, the first fuel system 160 may inject another liquid fuel, such as liquefied petroleum gas (LPG), and the second fuel system 162 may inject another gaseous fuel, such as vaporized LPG, or hydrogen. Also, while the example of the first and second fuel systems 160 and 162 injecting different types of fuel is shown and described, the present application is also applicable to fuel systems where the same fuel can injected at two different locations, such as directly into the cylinders and/or into intake ports of the cylinders.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

A position of the throttle valve 112 may be measured using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 196, for example, to coordinate shifting gears in a transmission (not shown). The ECM 114 may also communicate with one or more control modules of a vehicle, such as a hybrid control module, a chassis control module, and/or a body control module.

Figure 2:
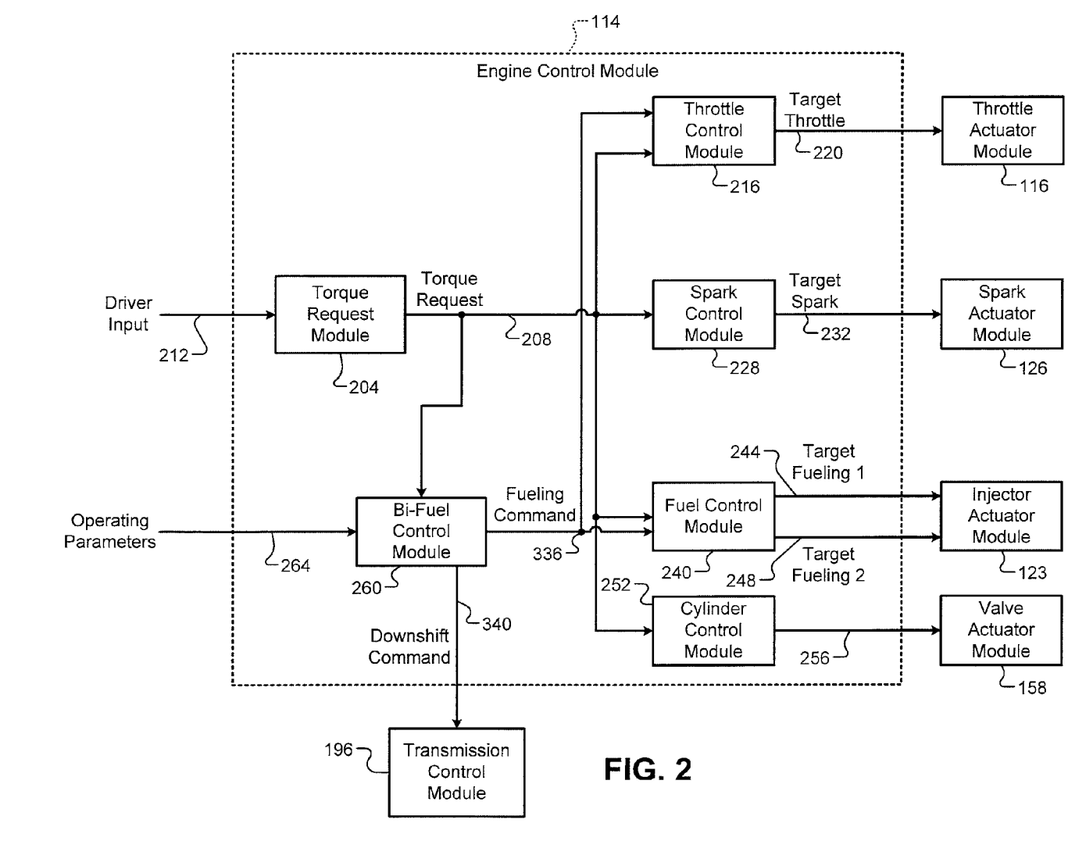
FIG. 2 is a functional block diagram of an example control system.

Referring now to FIG. 2, a functional block diagram of an example implementation of the ECM 114 is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other requests, such as other torque requests generated by the ECM 114 and/or torque requests received from other modules of the vehicle, such as the transmission control module 196, the hybrid control module, the chassis control module, etc. One or more engine actuators may be controlled based on the torque request 208 and/or one or more other vehicle operating parameters.

For example, a throttle control module 216 determines a target throttle opening 220 based on the torque request 208. The throttle actuator module 116 controls opening of the throttle valve 112 based on the target throttle opening 220. A spark control module 228 may determine a target spark timing 232 based on the torque request 208. The spark actuator module 126 controls spark based on the target spark timing 232.

A fuel control module 240 determines first and second target fueling parameters 244 and 248 for the first and second fuel systems 160 and 162, respectively, based on the torque request 208. For example only, the first target fueling parameters 244 may include a target amount and timing for injection of gasoline, and the second target fueling parameters 248 may include a target amount and timing for injection of CNG. Setting of the target fueling parameters 244 and 248 is discussed further below. The injector actuator module 123 controls the first and second fuel injection systems 160 and 162 to control fuel injection based on the first and second target fueling parameters 244 and 248, respectively.

A cylinder control module 252 may determine a target number of cylinders to activate and/or deactivate based on the torque request 208. The cylinder control module 252 may also determine target intake and/or exhaust valve phasing angles based on the torque request 208. Targets for controlling the intake and exhaust valves of the cylinders are collectively illustrated by 256. The valve actuator module 158 controls activation/deactivation and phasing of the intake and exhaust valves of the cylinders based on the target number of cylinders and the target valve phasing angles. Fueling is disabled to deactivated cylinders. One or more other engine actuators may additionally be controlled based on the torque request 208.

Different fuels have different densities. For example, CNG is less dense than liquid gasoline. A fuel that is less dense will displace more air in a port fuel injection system and would require higher manifold pressures to produce the same amount of torque as another fuel that is more dense. Opening the throttle valve 112, including opening the throttle valve 112 to a wide open throttle (WOT) position, increases air pressure within the cylinders and decreases pumping losses of the engine 102.

The following equation illustrates the oxidation of methane. Methane is the ideal content of CNG fuel.

$$CH_4 + 2O_2 \rightarrow CO_2 + 2H_2O$$

The stoichiometric air/fuel (A/F) ratio is a mass ratio determined as follows, for example, for methane:
1. The atomic weights are: Carbon (C) 12.01, Hydrogen (H) 1.008, Oxygen (O) 16
2. Molecular weight of Methane=(1*12.01)+(4*1.008)=16.042
3. Molecular weight of Oxygen=2*16=32
4. The Oxygen to fuel mass ratio=(2*32)/(1*16.042)=64/16.042=3.99
5. Oxygen comprises 23.2% of the mass of air so, 3.99×100/23.2=17.2 kg air.

Therefore, the stoichiometric air/fuel ratio of methane is 17.2:1. The following equation illustrates oxidation of gasoline.

$$C_8H_{18} + 12.5O_2 \rightarrow 8CO_2 + 9H_2O$$

Using a similar determination, the stoichiometric air/fuel ratio of gasoline can be determined to be 14.7:1.

The volumetric efficiency of methane is less than the volumetric efficiency of gasoline because of methane's lower density, which leads to greater intake charge displacement in a port fuel injection (PFI) system. Volumetric efficiency corresponds to actual airflow into a cylinder relative to a maximum value. PFI systems are less volumetrically efficient than direct injection systems due to the presence of intake charge displacement in PFI systems. Direct injection systems do not displace intake charge due to the injection of fuel directly into the cylinders.

Given the density of gasoline, methane, and air, the volumes (mass/density) of air and fuel for each fuel necessary to attain the respective stoichiometric air/fuel ratio can be determined. For CNG:

$$V_{AIR} = 17.2 \text{ kg}/1.204 \text{ kg/m}^3 = 14.29 \text{ m}^3,$$

therefore $$V_{CNG} = 1 \text{ kg}/0.668 \text{ kg/m}^3 = 1.50 \text{ m}^3,$$

For gasoline:

$$V_{AIR} = 14.7 \text{ kg}/1.204 \text{ kg/m}^3 = 2.21 \text{ m}^3,$$

therefore $$V_{GAS} = 1 \text{ kg}/4.816 \text{ kg/m}^3 = 0.21 \text{ m}^3.$$

$V_{AIR}$ is the volume of air necessary to achieve the corresponding stoichiometric air/fuel ratio. $V_{CNG}$ is the volume of CNG necessary to achieve the stoichiometric air/fuel ratio for CNG. $V_{GAS}$ is the volume of gasoline necessary to achieve the stoichiometric air/fuel ratio for gasoline.

To determine the amount of power loss due to intake charge (air) displacement, the follow equation can be used:

Power Loss=Volume of Fuel/(Volume of air+Volume of Fuel)

The following calculations are provided for a PFI system. In the case of a direct injection system, there are no power losses due to intake air displacement because the fuel is being injected directly into the cylinder. In view of the above, the power losses of gasoline and CNG are:

$$PL_{GAS} = 0.21/(12.21 + 0.21) = 1.6\%$$

$$PL_{CNG} = 1.50/(14.29 + 1.50) = 9.5\%,$$

where $PL_{GAS}$ is the power loss of gasoline and $PL_{CNG}$ is the power loss of CNG.

Therefore, a gasoline system has approximately an 8 percent (%) volumetric efficiency benefit over a CNG system due to intake charge displacement. Also, gasoline fueling has the added benefit of intake charge cooling due to the vaporization of liquid gasoline, which increases volumetric efficiency over a CNG system. As a result, a CNG-fueled engine would need to operate at higher manifold pressures to produce the same amount of torque as a gasoline engine.

According to the present disclosure, a bi-fuel control module 260 commands the fuel control module 240 to generate the second target fueling parameters 248 to provide CNG to one or more of the cylinders of the engine 102. The fuel control module 240 may set the first target fueling parameters 244 to provide gasoline to zero, one, or more other cylinders of the engine 102.

Based on the provision of CNG to one or more of the cylinders, the bi-fuel control module 260 also commands the throttle control module 216 to increase the target throttle opening 220 (relative to if one or more additional cylinders were provided with gasoline). For example only, the bi-fuel control module 260 may command that the target throttle opening 220 be set to open the throttle valve 112 to the WOT position. Given the opening of the throttle valve 112 to the WOT position, the bi-fuel control module 260 may also command the fuel control module 240 to set the second target fueling parameters 248 to provide CNG fuel to a greatest possible number of cylinders and to set the first target fueling parameters 244 to provide gasoline to a least possible number of cylinders to achieve the torque request 208. Opening the throttle valve 112 further decreases pumping losses of the engine 102.

When the torque request 208 is greater than or equal to a predetermined torque limit for current operating parameters 264 (e.g., current transmission gear ratio, number of cylinders being provided with CNG, etc.), the bi-fuel control module 260 determines a first cost value for switching a CNG fueled cylinder to being fueled with gasoline. The bi-fuel control module 260 also determines a second cost value for changing one or more of the current operating parameters 264. For example, the bi-fuel control module 260 may determine the second cost value for downshifting the transmission.

When the first cost value is less than the second cost value, the bi-fuel control module 260 commands the fuel control module 240 to increase the number of cylinders that are gasoline fueled, for example, by one. The increased opening of the throttle valve 112 allows the engine 102 to produce more torque by switching fueling of one or more cylinders from CNG to gasoline given the opening of the throttle valve 112. Intake and exhaust valve phasing of the cylinders being provided with gasoline can be optimized for the use of gasoline, while intake and exhaust valve phasing of the cylinders provided with CNG can be optimized for the use of CNG.

When the second cost value is less than the first cost value, the bi-fuel control module 260 commands the change in one or more of the operating parameters 264. For example, the bi-fuel control module 260 may command the transmission control module 196 to downshift the transmission. The bi-fuel control module 260 may also adjust one or more engine actuators based on the downshift.

As described above, while the example of increasing the number of cylinders that are fueled with gasoline is presented, the present disclosure is more generally applicable to increasing the number of cylinders that are fueled using a more volumetrically efficient fuel system. In the case of the injection of two different types of fuels, the number of cylinders that are provided with a more volumetrically efficient fuel is increased. In the case of injection of one type of fuel in different locations, the number of cylinders using a more volumetrically efficient fueling system (e.g., direct injection) is increased.

Figure 3:
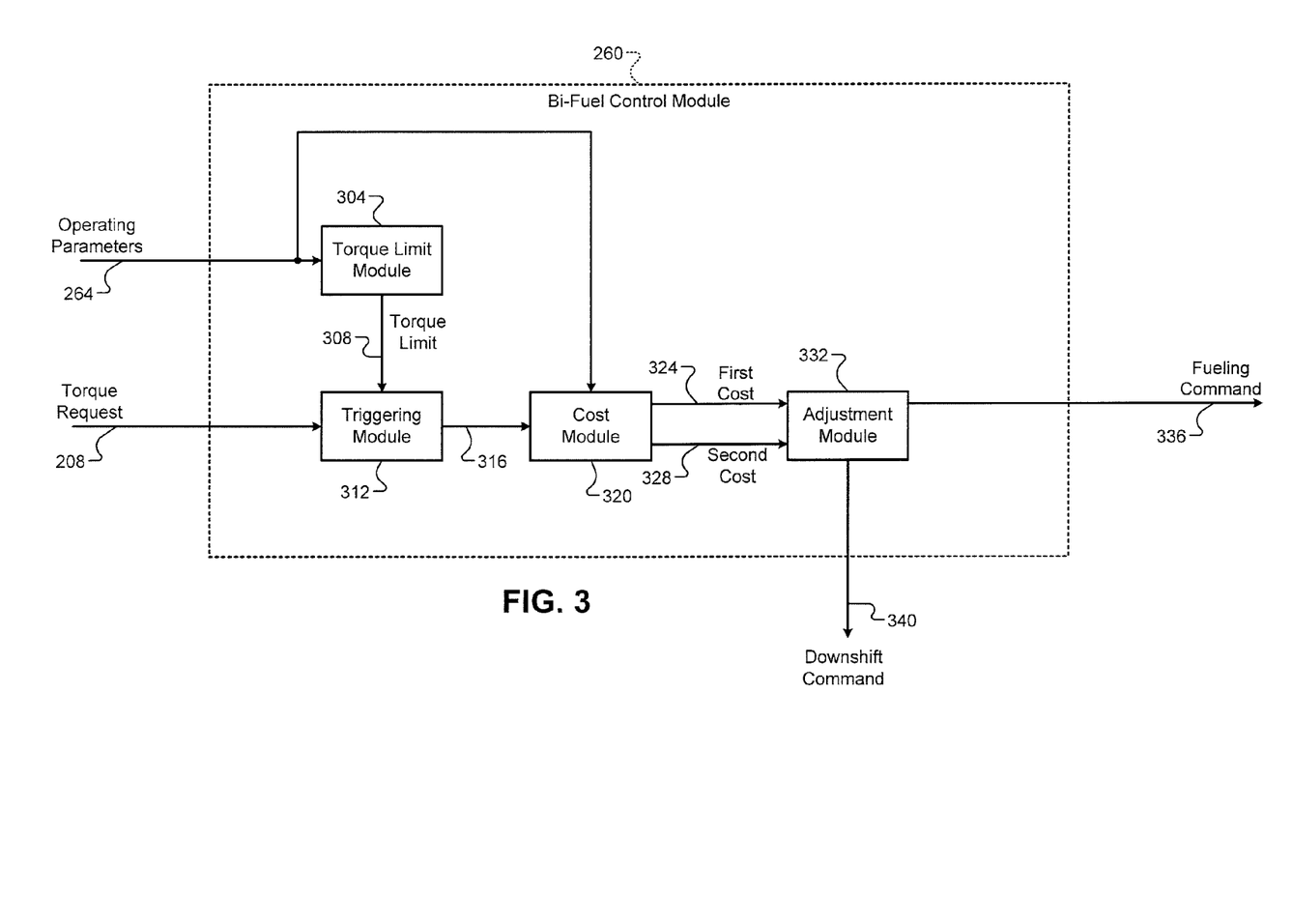
FIG. 3 is a functional block diagram of an example bi-fuel control module.

Referring now to FIG. 3, a functional block diagram of an example implementation of the bi-fuel control module 260 is presented. A torque limit module 304 determines an engine torque limit 308 based on the current operating parameters 264. For example, the current operating parameters 264 include the number of cylinders being fueled with CNG, the number of cylinders being fueled with gasoline, the current transmission gear ratio, and other operating parameters of the vehicle (and parameters that are not controllable, such as ambient temperature and ambient pressure). The current operating parameters 264 may be measured using sensors and/or commanded or target parameters. The torque limit module 304 may determine the engine torque limit 308 using one or more functions and/or mappings that relate the current operating parameters 264 to the engine torque limit 308.

A triggering module 312 generates a trigger signal 316 based on the torque request 208 and the engine torque limit 308. For example, the triggering module 312 may set the trigger signal 316 to a first state when the torque request is less than the engine torque limit 308. The triggering module 312 may set the trigger signal 316 to a second state when the torque request 208 is greater than or equal to the engine torque limit 308. In various implementations, a predetermined torque that is less than the engine torque limit 308 may be used in place of the engine torque limit 308. For example, a predetermined torque that is a predetermined percentage of the engine torque limit 308 may be used, where the predetermined percentage is less than 100%.

When the trigger signal 316 is in the second state, a cost module 320 determines a first cost value 324 for increasing the number of gasoline fueled cylinders by a predetermined number of cylinders. For example only, the predetermined number of cylinders may be 1 cylinder or 2 cylinders. The cost module 320 also determines a second cost value 328 for changing one or more other ones of the current operating parameters 264, such as for downshifting the transmission.

The cost module 320 may determine a first possible set of operating conditions based on the current operating parameters 264 and increasing the number of gasoline fueled cylinders (of the current operating parameters 264) by the predetermined number of cylinders and decreasing the number of CNG fueled cylinders by the predetermined number of cylinders. The cost module 320 may determine the first cost value 324 based on the first set of possible operating conditions, such as using one or more functions and/or mappings that relate sets of possible operating conditions to cost.

The cost module 320 may determine a second possible set of operating conditions based on the current operating parameters 264 and changing the transmission gear ratio (of the current operating parameters 264) if the transmission was downshifted. The cost module 320 may determine the second cost value 328 based on the second set of possible operating conditions, such as using the one or more functions and/or mappings that relate sets of possible operating conditions to cost.

An adjustment module 332 compares the first and second cost values 324 and 328. When the first cost value 324 is less than or equal to the second cost value 328, the adjustment module 332 commands the fuel control module 240 to increase the number of cylinders that are gasoline fueled and decrease the number of cylinders that are CNG fueled by the predetermined number of cylinders as indicated by 336. In response to the command 336, the fuel control module 240 increases the number of cylinders that are gasoline fueled and decreases the number of cylinders that are CNG fueled.

This allows the engine 102 to minimize the usage of gasoline for a desired torque output. The increased opening of the throttle valve 112 minimizes pumping losses.

When the second cost value 328 is less than the first cost value 324, the adjustment module 332 commands the transmission control module 196 to downshift the transmission as indicated by 340. The transmission control module 196 downshifts the transmission in response to the command 340.

Figure 4:
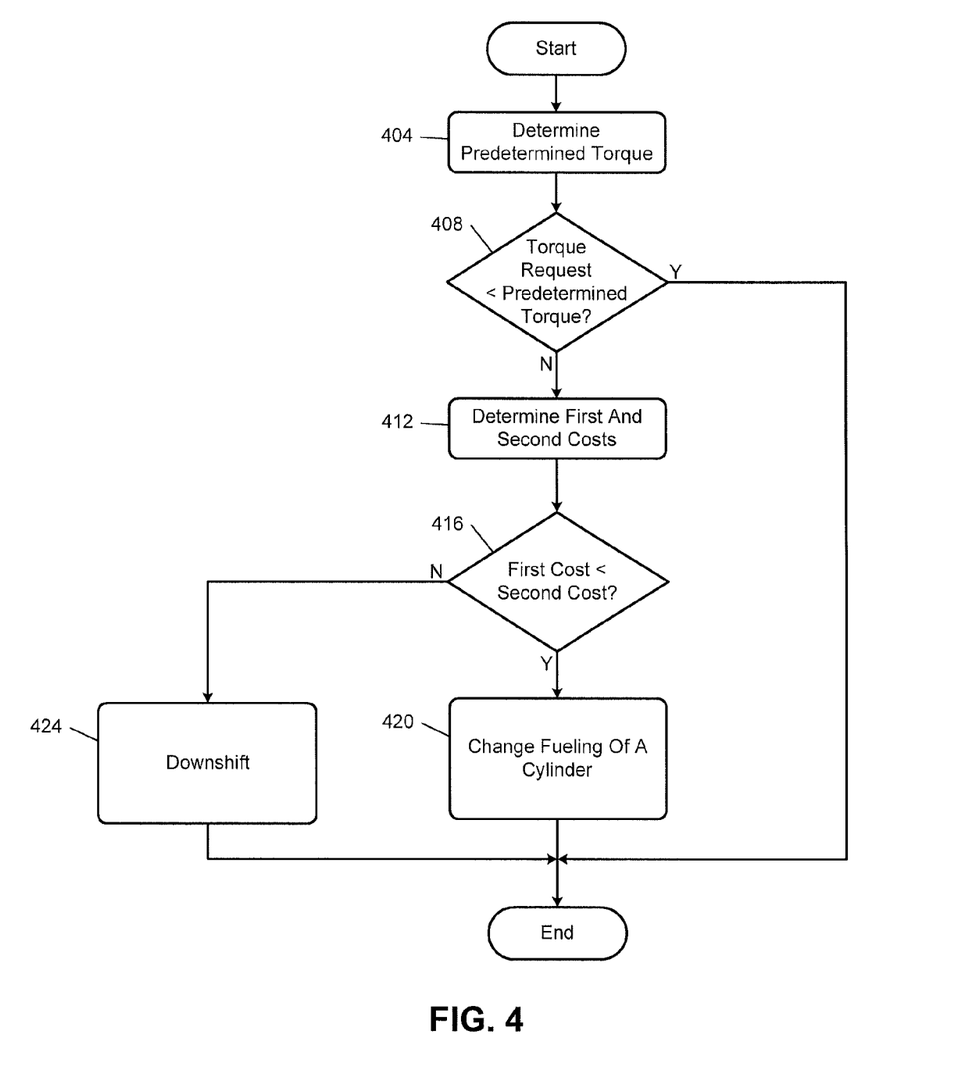
FIG. 4 is a flowchart illustrating an example method of controlling fueling.

Referring now to FIG. 4, a flowchart depicting an example method of controlling fueling of the engine 102 is presented. Control may begin with 404 where the torque limit module 304 determines the engine torque limit 308 based on the current operating parameters 264. The torque limit module 304 may also determine the predetermined torque based on the engine torque limit 308 at 404.

At 408, the triggering module 312 may determine whether the torque request 208 is less than the engine torque limit 308 or the predetermined torque. If 408 is true, control may end. If 408 is false, control may continue with 412. At 412, the cost module 320 determines the first and second cost values 324 and 328. The cost module 320 determines the first cost value 324 based on increasing the number of cylinders that will be fueled using the first (more volumetrically efficient) fuel system 160 and the other ones of the current operating parameters 264. The cost module 320 determines the second cost value 328 based on changing one or more of the current operating parameters 264, such as by downshifting the transmission. The cost module 320 determines the first and second cost values 324 and 328 using one or more functions and/or mappings that relate possible operating conditions to cost.

At 416, the adjustment module 332 determines whether the first cost value 324 is less than the second cost value 328. If 416 is true, the adjustment module 332 commands the fuel control module 240 to increase the number of cylinders that are fueled using the first fuel system 160 at 420. The fuel control module 420 then increases the number of cylinders that are fueled using the first fuel system 160 by the predetermined number of cylinders (e.g., 1) at 420, and control may end. If 416 is false, the adjustment module 332 commands the one or more operating conditions be changed. For example, the adjustment module 332 may command the transmission control module 196 to downshift the transmission at 424. Control may end after 424. While the example of FIG. 4 is shown as ending, FIG. 4 may represent one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system of a vehicle, comprising:
a fuel control module that, based on an engine torque request, fuels N cylinders of an engine using a first fuel system, wherein N is an integer greater than zero;
a throttle control module that, based on the engine torque request and the fueling of the N cylinders using the first fuel system, opens a throttle valve to a predetermined wide open throttle (WOT) position;
a cost module that, when the engine torque request is greater than a predetermined torque:
determines a first cost value for fueling at least one of the N cylinders of the engine using a second fuel system; and
determines a second cost value for downshifting a transmission of the vehicle; and
an adjustment module that:
when the first cost value is less than the second cost value, initiates the fueling of the at least one of the N cylinders using the second fuel system; and
when the second cost value is less than the first cost value, commands downshifting of the transmission.

2. The control system of claim 1 wherein the cost module:
determines a first set of possible operating parameters based on current operating parameters and based on fueling at least one of the N cylinders of the engine using the second fuel system;
determines the first cost value based on the first set of possible operating parameters;
determines a second set of possible operating parameters based on the current operating parameters and based on downshifting the transmission; and determines the second cost value based on the second set of possible operating parameters.

3. The control system of claim 2 further comprising a torque limit module that determines the predetermined torque based on the current operating parameters.

4. The control system of claim 1 further comprising:
the first fuel system, wherein the first fuel system injects a first type of fuel; and
the second fuel system, wherein the second fuel system injects a second type of fuel that is different than the first type of fuel.

5. The control system of claim 4 wherein:
the first type of fuel is compressed natural gas (CNG); and
the second type of fuel is gasoline.

6. The control system of claim 1 further comprising:
the first fuel system, wherein the first fuel system injects a first fuel at first locations associated with the cylinders, respectively;
the second fuel system, wherein the second fuel system injects a second fuel at second locations associated with the cylinders, respectively; and
wherein the first locations are different than the second locations.

7. The control system of claim 1 further comprising:
the first fuel system, wherein the first fuel system injects a first fuel into intake ports associated with the cylinders, respectively; and
the second fuel system, wherein the second fuel system injects a second fuel directly into the cylinders, respectively.

8. A control method for a vehicle, comprising:
based on an engine torque request, fueling N cylinders of an engine using a first fuel system, wherein N is an integer greater than zero;
based on the engine torque request and the fueling of the N cylinders using the first fuel system, opening a throttle valve to a predetermined wide open throttle (WOT) position;
when the engine torque request is greater than a predetermined torque:
determining a first cost value for fueling at least one of the N cylinders of the engine using a second fuel system; and
determining a second cost value for downshifting a transmission of the vehicle; and
when the first cost value is less than the second cost value, initiating the fueling of the at least one of the N cylinders using the second fuel system; and
when the second cost value is less than the first cost value, downshifting the transmission.

9. The control method of claim 8 further comprising:
determining a first set of possible operating parameters based on current operating parameters and based on fueling at least one of the N cylinders of the engine using the second fuel system;
determining the first cost value based on the first set of possible operating parameters;
determining a second set of possible operating parameters based on the current operating parameters and based on downshifting the transmission; and
determining the second cost value based on the second set of possible operating parameters.

10. The control method of claim 9 further comprising determining the predetermined torque based on the current operating parameters.

11. The control method of claim 8 wherein:
the first fuel system injects a first type of fuel; and
the second fuel system injects a second type of fuel that is different than the first type of fuel.

12. The control method of claim 11 wherein:
the first type of fuel is compressed natural gas (CNG); and
the second type of fuel is gasoline.

13. The control method of claim 8 wherein:
the first fuel system injects a first fuel at first locations associated with the cylinders, respectively;
the second fuel system injects a second fuel at second locations associated with the cylinders, respectively; and
the first locations are different than the second locations.

14. The control method of claim 8 wherein:
the first fuel system injects a first fuel into intake ports associated with the cylinders, respectively; and
the second fuel system injects a second fuel directly into the cylinders, respectively.

* * * * *